United States Patent [19]
Jackson

[11] 4,265,290
[45] May 5, 1981

[54] TIRE AND WHEEL RIM ASSEMBLIES

[75] Inventor: William L. Jackson, Sutton Coldfield, England

[73] Assignee: Dunlop Limited, London, England

[21] Appl. No.: 44,323

[22] Filed: May 31, 1979

[30] Foreign Application Priority Data

Jun. 6, 1978 [GB] United Kingdom ............... 26376/78

[51] Int. Cl.³ ............................................. B60C 17/04
[52] U.S. Cl. .............................. 152/330 RF; 152/158
[58] Field of Search ............... 152/155, 156, 157, 158, 152/246, 247, 251, 271, 330 R, 330 RF, 330 L

[56] References Cited

U.S. PATENT DOCUMENTS

| | | | |
|---|---|---|---|
| 3,025,898 | 3/1962 | Opel | 152/158 |
| 3,509,928 | 5/1970 | Aghnides | 152/158 |
| 3,578,056 | 5/1971 | Wynbelt | 152/340 |
| 3,682,219 | 8/1972 | Lindley | 152/158 |
| 3,945,419 | 3/1976 | Kosanke | 152/339 |
| 3,949,796 | 4/1976 | Bartos | 152/158 |
| 4,081,014 | 3/1978 | Searle | 152/330 RF |
| 4,137,894 | 2/1979 | Gardner et al. | 152/330 RF |
| 4,157,106 | 6/1979 | Cataldo | 152/158 |
| 4,173,243 | 11/1979 | Wilde et al. | 152/330 RF |

FOREIGN PATENT DOCUMENTS

| | | | |
|---|---|---|---|
| 2428472 | 1/1976 | Fed. Rep. of Germany | 152/158 |
| 2817394 | 11/1978 | Fed. Rep. of Germany | 152/157 |
| 29269 | of 1897 | United Kingdom . | |
| 956576 | 4/1964 | United Kingdom . | |

*Primary Examiner*—John E. Kittle
*Attorney, Agent, or Firm*—Stevens, Davis, Miller & Mosher

[57] ABSTRACT

A pneumatic tire and wheel rim assembly containing a support hoop which supports the vehicle to which the assembly is fitted when the tire deflates by contacting the inside of the tire tread at the top and bottom of the assembly. The dimensions of the hoop are such that its inner surface does not touch the rim whether the tire is inflated or deflated, and its outer surface does not touch the tire when inflated normally.

21 Claims, 8 Drawing Figures

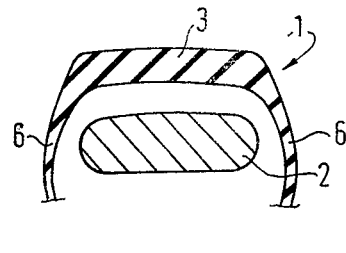
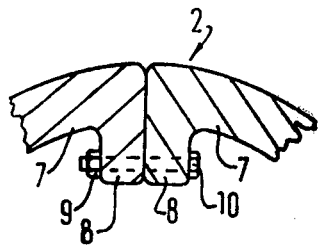
FIG.4  FIG.5
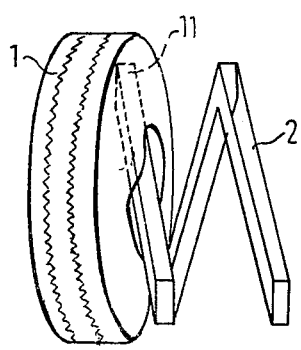
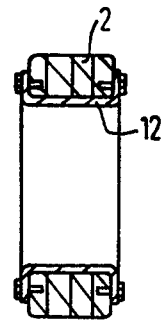
FIG.6a  FIG.6b
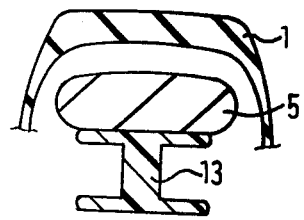
FIG.7

TIRE AND WHEEL RIM ASSEMBLIES

This invention relates to pneumatic tire and wheel rim assemblies and in particular to assemblies each containing an emergency support hoop.

It has long been an object of tire manufacturers to produce a satisfactory "run-flat" tire, that is, a tire which, on sudden deflation, caused for example by a puncture, is held in position on its wheel rim and permits the vehicle to be driven as far as the place of repair, albeit at reduced speed. One of the more successful of the proposals in this field is the provision in a pneumatic tire and wheel rim assembly of a support hoop closely encircling the wheel rim with its radially inner surface being in contact with the rim for rotation thereon, and its radially outer surface being adapted to provide a support for the radially inner surface of the tread portion of the tire on accidental deflation thereof, for example by a rapid puncture.

However, this latter construction suffers from two disadvantages. First, owing to the different radii of the tread portion, the hoop and the wheel rim, when the tire is deflated and the radially inner surface of the tread portion comes into contact with the radially outer surface of the hoop, slippage must occur either between the tread portion and the radially outer surface of the hoop or between the wheel rim and the radially inner surface of the hoop, or both forms of slippage can occur. This relative rotation is, of course, resisted by frictional forces and generates undesirable heat, and although various means have been proposed for obviating this difficulty nevertheless it provides an obstacle to the more wide-spread adoption of the construction referred to above. The second disadvantage is illustrated in FIG. 1 of the accompanying drawings of a prior art assembly. At A the tread portion 3 of the tire 1 is trapped between the hoop 2 and the ground 4, and at B the rim 5 bears downwardly on the hoop. Thus the full load on the tire 1 is carried by the relatively restricted area between A and B. This concentrated load leads to rapid wear of the contact surfaces but, more important, the only compliance between the rim 5 and the ground 4 is through the tread portion between A and B, and the rubber of that portion does not provide adequate cushioning against the effect of ground irregularities.

According to the present invention there is now provided a pneumatic tire and wheel rim assembly in which the tire has a tread portion and two sidewalls each sidewall having a tire bead located on a respective bead seat of the wheel rim, the assembly containing an emergency support hoop located in the chamber defined by the tire and the wheel rim by means of positioning means, the relative dimensions of the support hoop and the tire and their disposition relative to each other being such that the radially outer surface of the support hoop remains out of contact with the inner surface of the tread portion of the tire when the tire is at a normal inflation pressure, and the radius of the radially inner surface of the support hoop is greater than the radius of the wheel rim, whereby when the tire becomes deflated, the radially inner surface of the tread portion comes into contact with the radially outer surface of the support hoop at the lowest and highest parts of the hoop only and the radially inner surface of the support hoop remains out of contact with the wheel rim.

It will be appreciated that in the absence of deflection of the tire, either when at rest or running on a road surface, the hoop could be kept out of contact with the radially inner surface of the tire tread portion simply by mounting the support hoop concentrically with the tire and spaced a minimum distance apart therefrom. However, deflection of the tire does occur and therefore the maximum dimension of the radius of the radially outer surface of the hoop has to be chosen to allow for said deflection so that the hoop can be kept out of contact with the tread portion of the tire at substantially all times while the tire is at a normal inflation pressure.

It will be seen that FIG. 2 of the accompanying drawings shows a cross-section through an assembly according to the invention which overcomes these difficulties. For clarity, no positioning means is shown. The tire 1 is shown in the deflated condition. As before, the load is carried by contact between the support hoop 2 and the tire tread 3 at A but now there is no contact at B, the clearance here being great enough to prevent contact. Instead the hoop pushes upwards against the inside of the top of the tire at position C thereby supporting the tread and any breaker. This supports the sidewalls so that the rim and bead hang downwards supported by the sidewall tension (indicated by the arrows at the top of FIG. 2). The speed of the radially outer surface of the hoop is the same as that of the inner surface of the tread portion (including the breaker) so that there is no slippage. The radially inner surface of the hoop makes no contact with the rim so that there is no slippage there.

The tension in the sidewalls tends to straighten them out allowing a degree of compliance between the rim 5 and the support hoop 2. Thus the two main disadvantages of the prior construction referred to above are overcome.

To achieve these results the hoop dimensions should lie within certain limits as defined below. Referring to FIG. 3 which shows part of the assembly according to the invention (as shown in FIG. 2 but with the tire inflated), in more detail:

R = radius of the inner surface of the tread portion 3
r = radius of the radially outer surface of the hoop 2
m = radius of the radially inner surface of the hoop 2
M = radius of the outer surface of the rim 5
d = normal working deflection of the tread portion 3
h = increase in section height of the tire necessary to straighten the sidewalls
E = elastic reduction in the hoop diameter due to load carried when the tire is deflated.

The values of these parameters for an assembly according to the invention would then be governed by the following two expressions:

$$R - r > d \tag{i}$$

$$m - M > R - r + h + E \tag{ii}$$

The first expression ensures that under normal inflated conditions the hoop does not contact the inside of the tire. The second expression ensures that after deflation the radially inner surface of the hoop does not contact the rim.

The hoop may have a wide variety of cross-section shapes subject to the condition that its radially outer surface provides a good platform for the tread inner surface over the whole of the width of the latter. The width is taken as the whole of that portion which is relatively flat in cross-section and does not include the portions where the inner surface of the tire curves down towards the sidewalls. FIG. 4 shows an example.

The hoop may be made from a very wide range of materials. Besides being strong enough to support the load applied to the assembly across its diameter, the support hoop should be sufficiently rigid not to add significantly to the tire deflection, (for example the reduction (E) in hoop diameter (2r) under full load could be about 5% of the tire section height), elastic enough to recover from deflection and it should preferably retain these properties up to a temperature about 150° C. It can be made from steel, from solid plastics material or from glass-reinforced plastics material, for example.

In FIG. 2 no positioning means for the hoop inside the annular cavity defined by the tire and rim is illustrated. Without any positioning means, when the vehicle to which the assembly is fitted is at rest, the bottom of the hoop will rest on the radially inner surface of the tread at the lowest part of the tire while the top part of the hoop will rest against the inside surface of one of the tire sidewalls. When the vehicle moves and the assembly rotates the hoop will also rotate due to the frictional contact with the inside of the tire. The hoop will move about in all directions due for example to sideways (centrifugal) forces as the vehicle changes direction or to upwards forces as the tire rides over irregularities etc on the ground. This can cause certain unwanted effects e.g. undue noise and/or uncomfortable shock forces as the hoop hits the tire, wear on the inside surface of the tire and some heat generation. For these reasons, the positioning means for holding the hoop clear of interior surface of the tire during normal inflated use is provided. However when the tire is deflated, the positioning means must allow the hoop both to rotate relative to the rim and to contact the interior surface of the tire tread portion at the highest and lowest parts of the tire.

There are now described, by way of example and with reference to the accompanying drawings, tubeless pneumatic tire and wheel rim assemblies according to the present invention.

In the drawings:

FIG. 4 is a diagrammatic cross-section on a radius of an assembly according to the invention showing part of the tire and the support hoop;

FIG. 5 is a side elevation of part of the support hoop showing one means of connecting together component portions of the hoop;

FIG. 6(a) shows a support hoop in the form of a helical spring, the hoop being in a relaxed condition prior to installation in the assembly;

FIG. 6(b) shows the hoop of FIG. 6(a) in position in the assembly; and

FIG. 7 shows a radial cross-section of part of an assembly including a positioning means comprising an annular support web placed between the hoop and the rim.

Figure 2:
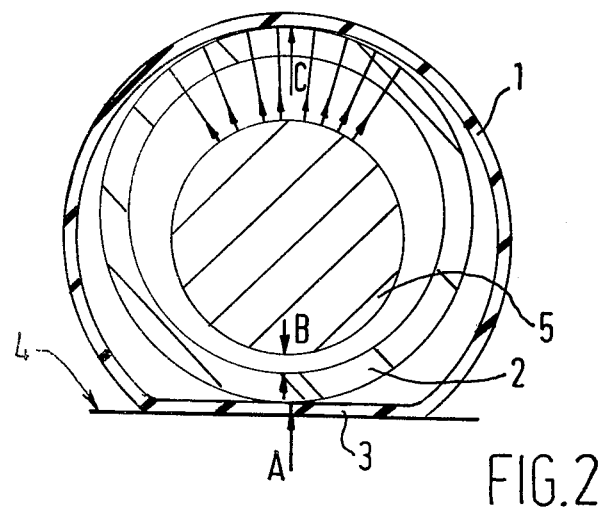
FIG. 2 is a diagrammatic cross-section on the mid-circumferential plane of a tubeless pneumatic tire and wheel rim assembly according to the invention showing the tire in a deflated condition.
Figure 1:
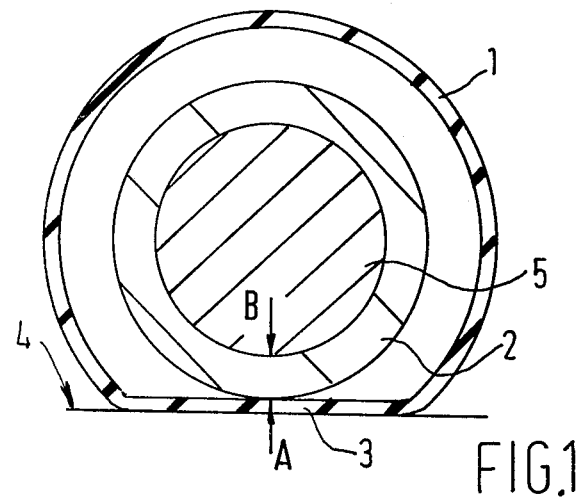
FIG. 1 is a diagrammatic cross-section on the mid-circumferential plane of a tire and wheel rim assembly of the prior art, included for the purposes of comparison.

Referring now to FIGS. 2 to 6(b) inclusive, the assembly according to the invention comprises a tubeless pneumatic tire 1 having a tread portion 3, a pair of sidewalls 6 extending from the tread portion, each sidewall terminating in a tire bead (not shown). The tire 1 is mounted on a wheel rim 5, the tire beads being located respectively on bead seats of the rim. The tire has a conventional carcass containing radially disposed reinforcing cords extending through the tire from one bead to the other. Inside the annular cavity defined by the rim 5 and the tire 1 is a rigid, circular emergency support hoop 2 whose radial cross-section is as shown in FIG. 4 from which it will be seen that the radially outer surface of the hoop has a profile substantially similar to the profile of the radially inner surface of the tread portion 3 of the tire. Preferably, the profile of the outer surface of the hoop is such as to ensure that the tire contact pressure is substantially uniform across the width of the contact patch between tire and ground.

Figure 3:
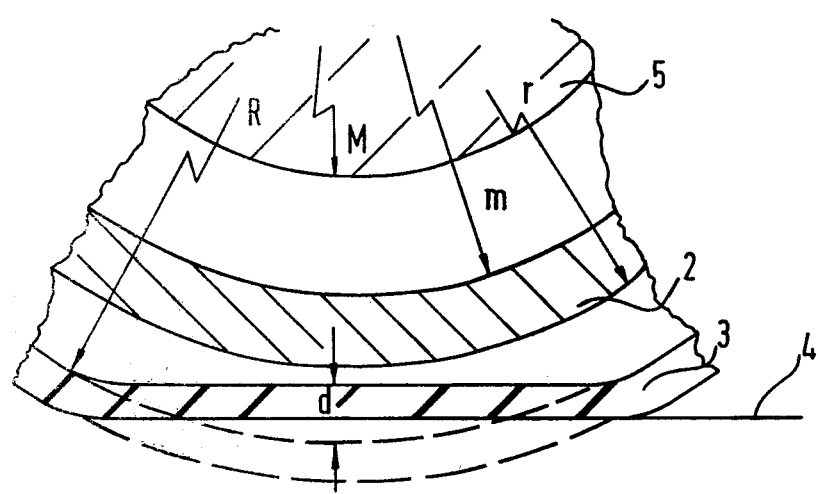
FIG. 3 is a diagrammatic cross-section showing part only of the wheel rim, the emergency support hoop and the tread portion of the tire shown in FIG. 2, the tire being at normal inflation pressure and under normal load.

With reference to FIG. 3, the radius of the radially outer radial surface of the support hoop 2 is less than that of the radially inner surface of the tread portion 3 of the tire 1 even when the latter (as shown in FIG. 3) has been deflected radially inwardly by the distance d, and therefore the hoop 2 does not come into contact with the tread portion 3 when the tire 1 is used under normal conditions of inflation and load. The radius of the radially inner surface of the hoop 2 is greater than the largest diameter of the wheel rim 5, and the hoop 2 does not come into contact with the wheel rim 5 when the tire 1 is run under deflated conditions as is explained in more detail below.

In the tire and wheel rim assembly as installed on a motor vehicle, the hoop is held in position with respect to the tire by positioning means (not shown in FIGS. 2-6b) which maintains the hoop 2 out of contact with the inner surface of the tread portion 3 of the tire 1 when the tire (whether at rest or running over the ground) is at a normal inflation pressure. In order to avoid imbalance under the centrifugal force generated when the assembly rotates, the hoop 2 is preferably disposed relative to the rim 5 and the tire 1 so as to be substantially concentric with the rim 5 until accidental deflation of the tire 1 occurs and the hoop 2 is required to fulfil its intended purpose.

For ease of insertion the hoop 2 of the assembly may be constructed in any one of the following ways, given by way of example only.

As shown in FIG. 5 the hoop 2 may comprise a plurality of curved sections 7 each having an inwardly extending flange 8 at each end. The sections 7 are held together by means of a nut 9 and bolt 10 inserted through a hole in each abutting flange 8. In order to prevent the inwardly-extending flanges touching the rim, the radius of the inner extremity of each flange must be considered as equal to m in the expressions above. Alternatively the hoop sections may be formed with circumferentially overlapping flanges and bolted together, the bolt extending parallel to the hoop axis.

As shown diagrammatically in FIGS. 6a and 6b, the hoop 2 may be in the form of a spring, or split ring having a plurality of overlapping leaves, so that a leading edge 11 may be inserted at one side of the tire 1 and "screwed" into the tire (as shown in FIG. 6a). The leaves of the spring may then, if necessary, be bolted together directly, or to a channel member 12 (as shown in FIG. 6b).

One form of positioning means for holding the hoop 2 in the required position is illustrated in FIG. 7. This means comprises a location web 13 between the hoop 2 and the rim (not shown). However this is an example only. It is intended that this location web 13, however formed, is to be relatively weak so that although it is to be strong enough to hold the hoop 2 in position concentrically with the rim and withstand the relatively small vibration forces arising in normal use it will not be strong enough to support any more than a small part, e.g. 5% of the load of the vehicle applied to the assembly when the tire 1 is deflated. The web 13 may for example be made of a brittle foamed plastics material which would break up when the tire experienced an accidental deflation under load.

Alternatively, the positioning means may comprise a positioning hoop having an internal radius equal to that of the rim, of an elastomeric material, having an external radius equal to the internal radius of the support hoop and which is sufficiently strong and/or rigid to retain the support hoop in position substantially concentric with the rim during normal inflated running of the wheel and tire assembly but which is sufficiently deformable to allow the support hoop to move into contact with the tire tread at the uppermost and lowest parts of the tire when the tire deflates. As stated previously the support hoop must be allowed to rotate around the rim due to contact with the interior surfaces of the tire while the assembly is operating in the deflated condition of the tire and thus either the positioning hoop must be allowed to rotate freely relative to the rim, or the support hoop must be allowed to rotate freely relative to the positioning hoop, or both. It is therefore preferable to provide a lubricant, either in liquid form or as a solid coating of low friction material such as polytetrafluoroethylene, to lubricate contacting surfaces either between rim and positioning hoop, or between positioning hoop and support hoop, or between both pairs of surfaces.

The positioning hoop may comprise homogeneous solid elastomeric material, a foamed elastomeric material or elastomeric material having at least one inflation chamber. One or more support webs of brittle plastics material may be incorporated in the elastomer, the or each web breaking up when the tire deflates.

As a further alternative, the positioning means comprises a plurality of spokes capable of buckling and collapsing when the tire deflates sufficiently for the support hoop to contact the inside of the tread and start rotating.

The wheel rim of the assembly of the invention may be a split rim without a well, where this is not the case it may be necessary to provide means to prevent the beads from falling into the well, when the assembly is operating with the tire deflated, although depending on the shapes of the rim, tire and/or support hoop, the action of the hoop in pressing upwards against the tread portion and thereby tending to stretch the sidewalls may prevent bead dislodgement, even when cornering.

Having now described my invention—what I claim is:

1. A pneumatic tire and wheel rim assembly in which the tire has a tread portion and two sidewalls, each sidewall having a tire bead located on a respective bead seat of the wheel rim, the assembly containing positioning means and an emergency support hoop which is sufficiently rigid to support that part of the weight of the vehicle applied to the assembly, the hoop being located in the chamber defined by the tire and wheel rim by means of said positioning means, the relative dimensions of the support hoop and the tire and their disposition relative to each other being such that the support hoop remains out of contact with the inner surface of the tire when the tire is at a normal inflation pressure, and the radius of the radially inner surface of the support hoop is greater than the radius of the wheel rim, whereby when the tire becomes deflated, the positioning means allows the radially outer surface of the support hoop to contact the radially inner surface of the tread portion at the lowest and highest parts of the hoop only, the support hoop remaining out of contact with the wheel rim, and rotating with the tire.

2. A pneumatic tire and wheel rim assembly in which the tire has a tread portion and two sidewalls, each sidewall having a tire bead located on a respective bead seat of the wheel rim, the assembly containing positioning means and an emergency support hoop located in the chamber defined by the tire and wheel rim by means of said positioning means, the dimensions of the support hoop, tire and rim being governed by the following expressions:

$$R - r > d \quad \text{(i)}$$

$$m - M > R - r + h + E \quad \text{(ii)}$$

where
R = radius of the inner surface of the tread portion
r = radius of the radially outer surface of the hoop
m = radius of the radially inner surface of the hoop
M = radius of the outer surface of the rim
d = normal working deflection of the tread portion
h = increase in section height of the tire necessary to straighten the sidewalls
E = elastic reduction in the hoop diameter due to load carried when the tire is deflated.

3. A pneumatic tire and wheel rim assembly according to claim 1 wherein the support hoop has a radially outer cross-section profile substantially similar to the profile of the radially inner surface of the tread portion.

4. A pneumatic tire and wheel rim assembly according to claim 1 wherein the support hoop is disposed substantially concentric with the rim when the tire is inflated to normal pressure and the assembly is operating under normal load.

5. A pneumatic tire and wheel rim assembly according to claim 1 wherein the support hoop comprises a plurality of curved sections.

6. A pneumatic tire and wheel rim assembly according to claim 5 wherein the sections have means removeable securing them together.

7. A pneumatic tire and wheel rim assembly according to claim 1 wherein the support hoop is in the shape of a helical spring having a plurality of overlapping leaves.

8. A pneumatic tire and wheel rim assembly according to claim 7 wherein the leaves are bolted together.

9. A pneumatic tire and wheel rim assembly according to claim 7 wherein the leaves are capable of being bolted to a channel member.

10. A pneumatic tire and wheel rim assembly according to claim 1 wherein the support hoop is made from steel.

11. A pneumatic tire and wheel rim assembly according to claim 1 wherein the support hoop is made from plastics material.

12. A pneumatic tire and wheel rim assembly according to claim 1 wherein the positioning means comprises an annular support web.

13. A pneumatic tire and wheel rim assembly according to claim 12 wherein the web comprises a brittle foamed plastic capable of breaking up when the tire deflates and the hoop supports the load applied to the assembly.

14. A pneumatic tire and wheel rim assembly according to claim 1 wherein the positioning means comprises a positioning hoop having an internal radius equal to that of the rim and an external radius equal to the internal radius of the support hoop, said positioning hoop comprising elastomeric material.

15. A pneumatic tire and wheel rim assembly according to claim 14 wherein said positioning hoop comprises homogeneous solid elastomeric material.

16. A pneumatic tire and wheel rim assembly according to claim 14 wherein said positioning hoop comprises foamed elastomeric material.

17. A pneumatic tire and wheel rim assembly according to claim 14 wherein said positioning hoop comprises elastomeric material having at least one inflation chamber.

18. A pneumatic tire and wheel rim assembly according to claim 14 wherein the radially outer surface of the rim and the radially inner surface of the positioning hoop is lubricated.

19. A pneumatic tire and wheel rim assembly according to claim 14 wherein the radially outer surface of the positioning hoop and the radially inner surface of the support hoop is lubricated.

20. A pneumatic tire and wheel rim assembly according to claim 1 wherein the positioning means comprises a plurality of spokes capable of buckling and collapsing when the tire deflates.

21. A support hoop for use inside the inflation chamber of a pneumatic tire and wheel rim assembly to prevent collapse of the tire upon deflation, the tire and wheel assembly having:

a radius R of the inner surface of the tire tread portion;

a radius M of the outer surface of the rim;

a normal working deflection d of the tire tread portion;

and an increase in section height h of the tire necessary to straighten the sidewalls thereof;

said support hoop being of generally annular shape with a radius m of its inner radial surface of greater dimension than radius M of the wheel rim and a radius r of its outer radial surface of lesser dimension than radius R of the tire so that when the tire is normally inflated a concentric support hoop therein would contact neither the wheel rim nor the inside of the tire tread;

said support hoop being sufficiently rigid to support that part of the load normally carried by the tire in which it is positioned with an elastic reduction E in hoop diameter due to such load;

the dimensions of the support hoop being such as to be governed by the following expression $$R - r > d \qquad \text{(i)}$$

$$m - M > R - r + h + E; \qquad \text{(ii)}$$

these relative dimensions being such that support hoop remains out of contact with the inner surface of the tire when it is at normal inflation pressure and, when the tire is deflated, the radially inner surface of the tire tread portion comes into contact with the radially outer surface of the support hoop at the lowest and highest parts of the hoop only and the support hoop remains out of contact with the wheel rim.

* * * * *